United States Patent
Alexeyenko

(10) Patent No.: US 11,248,999 B2
(45) Date of Patent: Feb. 15, 2022

(54) METHOD AND APPARATUS FOR MEASURING SLIP VELOCITY OF DRILL CUTTINGS OBTAINED FROM SUBSURFACE FORMATIONS

(71) Applicant: Saudi Arabian Oil Company, Dhahran (SA)

(72) Inventor: Alexey Alexeyenko, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 107 days.

(21) Appl. No.: 16/775,846

(22) Filed: Jan. 29, 2020

(65) Prior Publication Data

US 2021/0231546 A1 Jul. 29, 2021

(51) Int. Cl.
*G01N 11/02* (2006.01)
*E21B 21/06* (2006.01)

(52) U.S. Cl.
CPC ............ *G01N 11/02* (2013.01); *E21B 21/065* (2013.01)

(58) Field of Classification Search
CPC .............................. G01N 11/02; E21B 21/065
USPC ........... 422/500, 547, 549; 73/152.28, 53.01, 73/61.41, 61.42, 61.63–61.66, 61.68, 73/61.71, 61.77, 64.56, 152.43, 290 B, 73/290 V, 866, 149
See application file for complete search history.

(56) References Cited

U.S. PATENT DOCUMENTS

| | | | |
|---|---|---|---|
| 3,981,183 A | 9/1976 | Banks | |
| 4,182,178 A | 1/1980 | Nolte | |
| 5,608,170 A | 3/1997 | Atkinson et al. | |
| 5,731,527 A * | 3/1998 | Van Cleve | G01F 1/8477 138/172 |
| 6,988,406 B1 * | 1/2006 | Mack | G01F 23/02 73/305 |
| 7,882,856 B2 * | 2/2011 | Berry, Jr. | F16L 7/00 138/108 |
| 8,116,992 B1 | 2/2012 | Ludlow et al. | |

(Continued)

FOREIGN PATENT DOCUMENTS

EP 3095753 A1 11/2016
WO 2016094474 A1 6/2016

(Continued)

OTHER PUBLICATIONS

International Search Report and Written Opinion for International Application No. PCT/US2021/070091 report dated Mar. 19, 2021: pp. 1-15.

(Continued)

*Primary Examiner* — Robert R Raevis
(74) *Attorney, Agent, or Firm* — Bracewell LLP; Constance G. Rhebergen; Vivek P. Shankam

(57) ABSTRACT

Methods and systems for determining slip velocity of drill cuttings obtained from subsurface formations are disclosed. The system includes a first cylindrical tube having a first diameter and a first length, wherein the first tube is attached to a base plate, a second cylindrical tube having a second dimeter smaller than the first diameter and a second length larger than the first length, the second tube attached to a lower portion of the first tube and running substantially parallel to the first tube, and an ultrasonic device operatively connected to an opening of the second tube for measuring a level of a fluid in the second tube, and a computer operatively connected to the ultrasonic device, the computer configured to store and analyze data received from the ultrasonic device.

11 Claims, 4 Drawing Sheets

(56) References Cited

U.S. PATENT DOCUMENTS

| | | | | |
|---|---|---|---|---|
| 2002/0073775 | A1* | 6/2002 | Allein | G01F 23/04 |
| | | | | 73/325 |
| 2009/0013781 | A1* | 1/2009 | Hettinga | G01F 23/02 |
| | | | | 73/323 |
| 2009/0316944 | A1* | 12/2009 | Tiscareno | H04R 1/2896 |
| | | | | 381/346 |
| 2016/0290850 | A1* | 10/2016 | Kech | G01F 23/284 |
| 2016/0377472 | A1* | 12/2016 | Wech | G01F 23/02 |
| | | | | 73/326 |
| 2019/0120002 | A1 | 4/2019 | Zhang et al. | |

FOREIGN PATENT DOCUMENTS

| | | |
|---|---|---|
| WO | 2017010985 A1 | 1/2017 |
| WO | 2017027105 A1 | 2/2017 |

OTHER PUBLICATIONS

Garcia-Hernandez, Augusto et al.; "Determination of Cuttings Lag in Horizontal and Deviated Wells" SPE 109630, 2007 SPE Annual Technical Conference & Exhibition, Anaheim, CA, Nov. 11-14, 2007; pp. 1-11.

Hussaini, Syed M. et al.; "Experimental Study of Drilled Cuttings Transport Using Common Drilling Muds" Society of Petroleum Engineers Journal, Feb. 1983; pp. 11-20.

Sample, K.J. et al.; "An Experimental Evaluation of Correlations Used for Predicting Cutting Slip Velocity" SPE 6645, 52nd Annual Fall Technical Conference and Exhibition of the Society of Petroleum Engineers, 1977; pp. 1-12.

Sifferman, Thomas R. et al.; "Drill Cutting Transport in Full Scale Vertical Annuli" SPE 4514, Journal of Petroleum Technology, Vo. 26, Issue 11 (1974); pp. 1-12.

* cited by examiner

METHOD AND APPARATUS FOR MEASURING SLIP VELOCITY OF DRILL CUTTINGS OBTAINED FROM SUBSURFACE FORMATIONS

TECHNICAL FIELD

Embodiments relate to a method and apparatus for measuring slip velocity of drill cuttings obtained from subsurface formations.

BACKGROUND

The problems associated with measuring cuttings slip velocity in a drilling fluid are well known. There is no available technique directly measuring this drilling fluid parameter. Only computer models are available. Since it is important to determine the cuttings slip velocity ensuring the drilling fluid properties are within expected range the following measurement device has been proposed.

Typically, the basic parameters of drilling fluid are measured by existing techniques and cuttings slip velocity is derived using computer models.

SUMMARY

It is an object of the present invention to provide a system in which the slip velocity of drill cuttings can be determined substantially continuously. Direct mechanical measurement of cuttings slip velocity verifies existing computer models, and provides measurable input for precise treatment of drilling fluid. Further optimization of drilling fluid and drilling operations is also possible.

Accordingly, one example embodiment is a system for measuring slip velocity of drill cuttings obtained from a subsurface formation. The system includes a first cylindrical tube having a first diameter and a first length, wherein the first tube is attached to a base plate. The system also includes a second cylindrical tube having a second dimeter smaller than the first diameter and a second length larger than the first length, the second tube attached to a lower portion of the first tube and running substantially parallel to the first tube. The system also includes an ultrasonic device operatively connected to an opening of the second tube for measuring a level of a fluid in the second tube. The system also includes a computer operatively connected to the ultrasonic device, the computer configured to store and analyze data received from the ultrasonic device.

Another embodiment is a method for determining slip velocity of drill cuttings obtained from subsurface formations. The method includes filling the first tube with a drilling fluid including at least one of diesel and brine, equalizing the level of the drilling fluid in the first and the second tubes, determining density of the drill cuttings obtained from the subsurface formation, introducing the drill cuttings into the first tube, initiating a timer and letting the drill cuttings equalize or settle in the first tube, and determining slip velocity of the drill cuttings based on the time taken for fluid level to stabilize in the first tube and the second tube and the length of the first tube.

BRIEF DESCRIPTION OF THE DRAWINGS

All aspects and features of certain example embodiments of the present disclosure will be more apparent from the following description taken in conjunction with the accompanying drawings, in which.

DETAILED DESCRIPTION

The particulars shown here are by way of example and for purposes of illustrative discussion of the examples of the subject disclosure only, and are presented in the cause of providing what is believed to be the most useful and readily understood description of the principles and conceptual aspects of the subject disclosure. In this regard, no attempt is made to show more detail than is necessary, the description taken with the drawings making apparent to those skilled in the art how the several forms of the subject disclosure may be embodied in practice. Furthermore, like reference numbers and designations in the various drawings indicate like elements.

Figure 1:
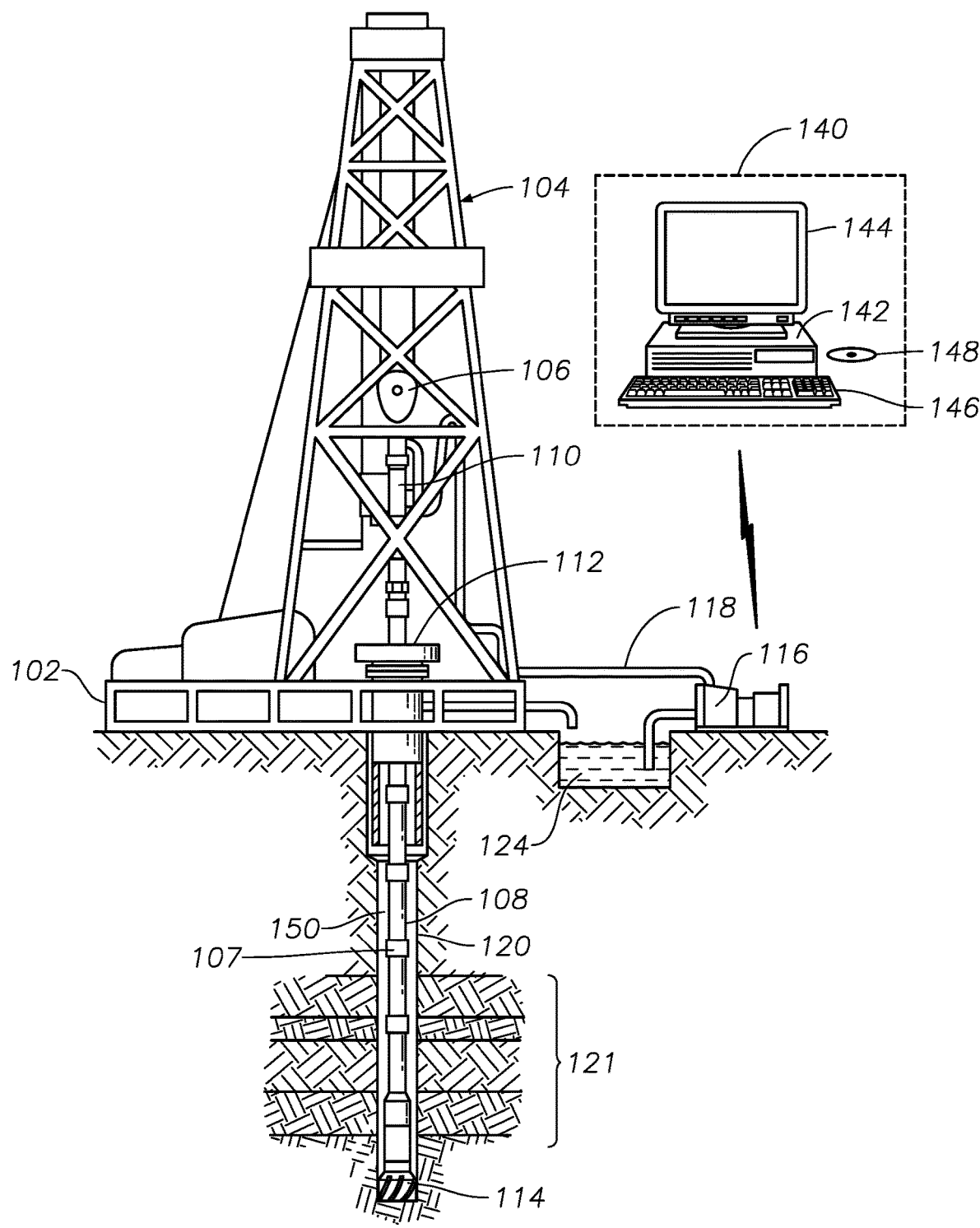
FIG. 1 illustrates a drilling environment for obtaining drill cuttings from a subsurface formation, according to one embodiment of the disclosure.

An illustrative drilling environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. Rotation of the drill bit 114 creates a borehole 120 that passes through various formations 121. A pump 116 circulates drilling fluid through a supply pipe 118 to the top drive 110, downhole through the interior of the drill string 108, through orifices in the drill bit 114, back to the surface via an annulus 150 around the drill string, and into a retention pit 124. The drilling fluid transports cuttings from the borehole 120 into the retention pit 124 and aids in maintaining the integrity of the borehole.

A computer system (or processing system) 140 is coupled to control the pump 116 and includes computing facilities for determining or simulating characteristics of a flow of a mixture of drilling fluid and cuttings in the annulus 150. In at least some embodiments, the computer system 140 includes a processor 142 that performs wellbore analysis operations by executing software or instructions obtained from a local or remote non-transitory computer-readable medium 148. The processor 142 may be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In at least some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 140 also may include input device(s) 146 (e.g., a keyboard, mouse, touchpad, etc.) and output device(s) 144 (e.g., a monitor, printer, etc.). Such input device(s) 146 and/or output device(s) 144 provide a user interface that enables an operator to interact with the pump 116 and/or software executed by the processor 142.

Figure 2:
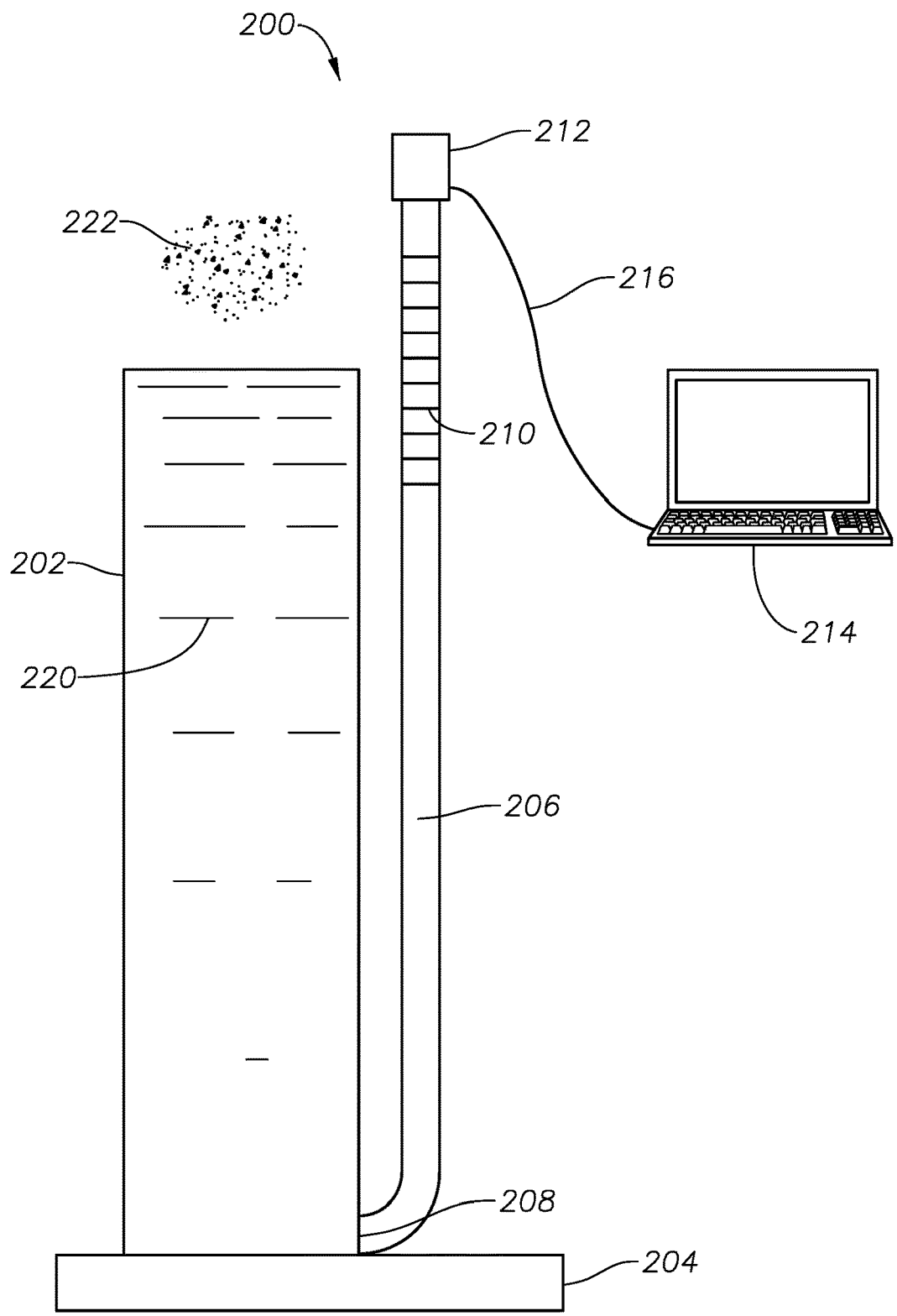
FIG. 2 illustrates an apparatus for measuring slip velocity of drill cuttings obtained from a subsurface formation, according to one embodiment of the disclosure.

FIG. 2 illustrates an apparatus 200 that may be used to measure slip velocity of the drill cuttings obtained from the subsurface formation 121 in FIG. 1. The apparatus 200 may include a plastic tube 202, about 10 cm in diameter and about 50 cm long, which stands vertically and firmly on a thick plastic base plate 204. The bottom of the tube 202 may be sealed to the plate 204. At the very bottom of the tube 202, a smaller tube 206, which may have a diameter of about 1 cm, is connected to tube 202 at location 208 and turned 90° up, and stands vertical about 10 cm taller than tube 202 in height. Smaller tube 206 may be made of transparent plastic with a smooth, non-sticky internal surface, and marked at the top part with 1 millimeter horizontal gradations 210. A miniature ultrasonic depth measurement device 212 may be mounted on top of smaller tube 206 and provide the change of fluid level measurements in regular (e.g. one second) time intervals. Measurements are recorded in a computer application, running for example on a computer 214 connected to the ultrasonic device 212. Ultrasonic device 212 may be easily installed on the smaller tube 206 and easily removed, and may be connected to computer 214 by standard data cable 216 for power and data transfer.

As illustrated in this figure, the apparatus 200 generally forms a U-shaped tube. In one embodiment, the apparatus 200 may be filled with drilling fluid 220 to make approximately a 50 cm column. When cuttings 222 are loaded in tube 202 the total fluid 220 column density in main tube 202 will increase, thus increasing fluid level in the smaller tube 206, where density did not change. With time, as cuttings 222 settle on the bottom of main tube 202, density of fluid 220 in main and smaller tubes 202, 206 become nearly equal. It should be noted here that since microscopic cuttings settle very slowly, beyond the reasonable time of the practical experiment, it is understood that fluid level may not return back to original level.

Ultrasonic depth measurement device 212 can also relieve laboratory personnel from regularly checking fluid level 220 change in smaller tube 206 and making manual records of the change trend in time. However, manual option may also be available with use of gradation on the smaller tube 206 and a regular watch.

Measuring Procedure

The following sections describe a method for measuring slip velocity of drill cuttings obtained from subsurface formations, according to one embodiment. Initially, main tube 202 is filled with a drilling fluid 220, for example diesel or brine, which may be collected at either flow line or suction. In the next step, fluid level is set to be at 50 cm mark to form exactly 50 cm column of fluid. In the next step, fluid level in smaller tube 206 may be equalized with the main tube 202 as the fluid flows through the U-shaped tube in apparatus 200.

In the next step, drill cuttings 222 collected at shale shaker may be delivered to mud lab. Volume of drill cuttings 222 should be within volume of about 5 cm of the main tube 202. Therefore, volume of cuttings 222 is measured by placing lose cuttings in a marked lab glass partially filled with a drilling fluid 220, such as diesel or brine. Displacement of the fluid volume is recorded, which indicates the cuttings volume. Fluid is then removed from lab glass to a second marked glass to measure volume of fluid left in the drill cuttings, and the glass with drill cuttings is weighted on a lab scale. The weight of the drill cuttings is calculated as lab scale indication minus the known lab glass weight. Finally, density of the drill cuttings is recorded.

When the measured drill cuttings are unloaded into a main tube 202, fluid level increases in the main 202 and smaller tube 206 according to the introduced volume, and the volume in the smaller tube 206 increases even higher than in the main tube 202 due to higher density in the main tube 202. Measurement is complete when fluid levels in both tubes are nearly equal or there is no recordable change. In the next step, difference in original and final levels in smaller tube 206 are an indication of portion of cuttings that did not settle. This difference can be measured precisely using gradating marks 210 on the smaller tube 206 that may be marked to the desired unit of volume. In the next step, the time from start of the measurement (cuttings unloaded into the main tube 202) is recorded. In the next step, known distance for cuttings to settle (0.5 meter) is divided by time obtained in the previous step, and the drill cuttings slip velocity is recorded in meters per hour, and converted to other desired units of measure.

Figure 3:
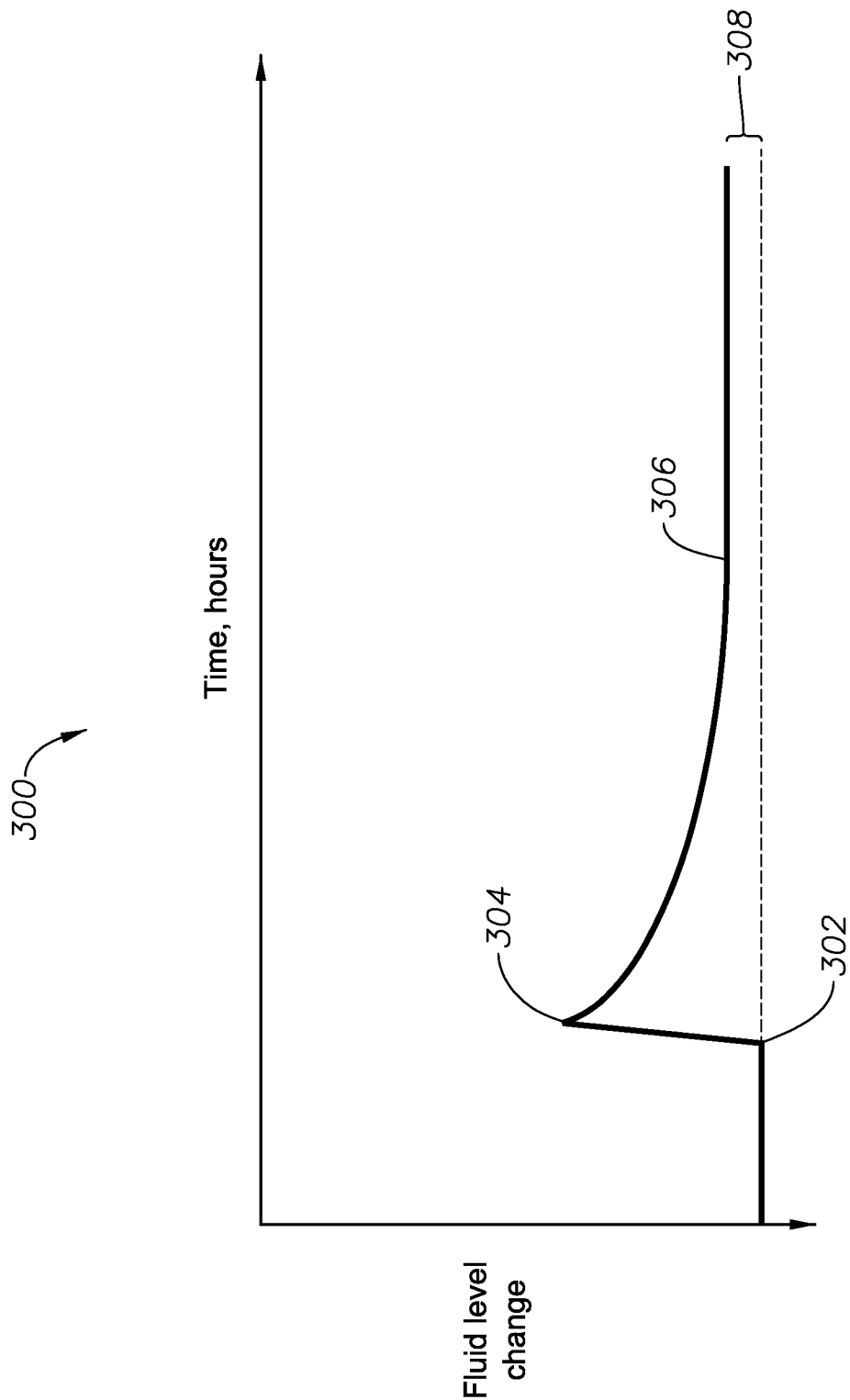
FIG. 3 illustrates example steps in a method for measuring slip velocity of drill cuttings obtained from a subsurface formation, according to one embodiment of the disclosure.

Turning now to FIG. 3, shown is a method 300 for measuring slip velocity of drill cuttings obtained from a subsurface formation, according to one example embodiment. Level 302 indicates level of fluid in the small tube 206, as measured by ultrasonic device 212, before drill cuttings 222 are introduced in the main tube 202. Level 304 indicates the level of fluid in the smaller tube 206, as measured by ultrasonic device 212, immediately after cuttings 222 is introduced in the main tube 202, at the start of measurement. Level 306 indicates the level of fluid in the small tube 206, as measured by the ultrasonic device 212, when there is no apparent level change at the end of measurement. Level 308 indicates the difference in original and final level in the smaller tube 206 due to portion of drill cuttings 222 in the main tube 202 that did not settle within the time of measurement.

Figure 4:
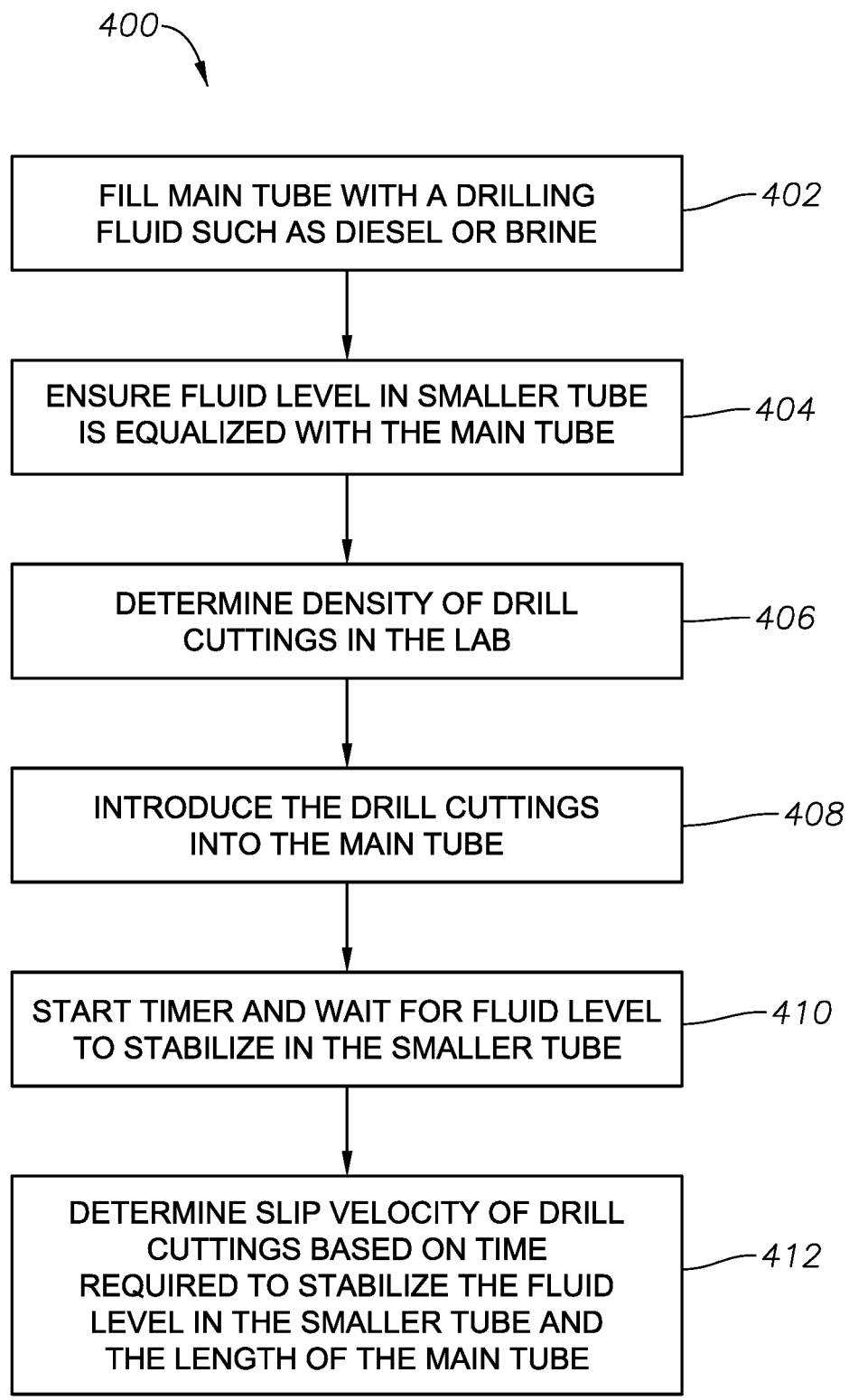
FIG. 4 illustrates example steps in a method for measuring slip velocity of drill cuttings obtained from a subsurface formation, according to one embodiment of the disclosure.

FIG. 4 shows a workflow diagram 400 for measuring slip velocity of drill cuttings obtained from a subsurface formation, according to one example embodiment. At step 402, main tube 202 is filled with a drilling fluid 220, for example diesel or brine, which may be collected at either flow line or suction. Fluid level may be set to be at 50 cm mark to form exactly 50 cm column of fluid. At step 404, fluid level in smaller tube 206 may be equalized with the main tube 202 as the fluid flows through the U-shaped tube in apparatus 200.

At step 406, drill cuttings 222 collected at shale shaker may be delivered to mud lab. Volume of drill cuttings 222 should be within volume of about 5 cm of the main tube 202. Therefore, volume of cuttings 222 is measured by placing lose cuttings in a marked lab glass partially filled with a drilling fluid 220, such as diesel or brine. Displacement of the fluid volume is recorded, which indicates the cuttings volume. Fluid is then removed from lab glass to a second marked glass to measure volume of fluid left in the drill cuttings, and the glass with drill cuttings is weighted on a lab scale. The weight of the drill cuttings is calculated as lab scale indication minus the known lab glass weight. Finally, density of the drill cuttings is recorded.

At step 408, when the measured drill cuttings are unloaded into a main tube 202, fluid level increases in the main 202 and smaller tube 206 according to the introduced volume, and the volume in the smaller tube 206 increases even higher than in the main tube 202 due to higher density in the main tube 202. At step 410, measurement is complete when fluid levels in both tubes are nearly equal or there is no recordable change. Difference in original and final levels in smaller tube 206 are an indication of portion of cuttings that did not settle. This difference can be measured precisely using gradating marks 210 on the smaller tube 206 that may be marked to the desired unit of volume. At step 412, the time from start of the measurement (cuttings unloaded into the main tube 202) is recorded. In the next step, known distance for cuttings to settle (0.5 meter) is divided by time obtained in the previous step, and the drill cuttings slip velocity is recorded in meters per hour, and converted to other desired units of measure. In other words, the slip velocity of the drill cuttings is determined based on the time required for the drill cuttings to reach the bottom of the main tube and the length of the main tube.

As noted earlier, estimates of a pressure gradient and a concentration of cuttings may also be predicted or estimated. In particular, the presence of cuttings in an annulus may have a significant effect on a pressure profile of a wellbore. As such, conditions related to hole cleaning (e.g., cuttings concentration) and pressure loss in the wellbore may be closely related. Estimates of a pressure gradient and a concentration of particles may be based upon cuttings slip velocity. Therefore, an improved approach to the estimation of the cuttings slip velocity may likewise improve the estimation of parameters such as pressure gradient and cuttings concentration.

Hole cleaning is often important in drilling operations because inadequate hole cleaning can lead to stuck pipe, fractured formation, high rotary torque, premature bit wear, decreased rate of penetration (ROP), and/or logging, casing, and cementing problems. According to one study, a significant amount (around 70%) of time that is lost due to unexpected events is associated with stuck pipe. Also, a third of situations involving stuck pipe were due to inadequate hole cleaning.

According to aspects of this disclosure, considerations relating to hole cleaning and considerations relating to the pressure profile in a wellbore are considered jointly, rather than separately. For example, according to various embodiments, cuttings slip velocity is used in conjunction with analysis based on one or more mechanistic models, in order to model a hole cleaning process and a wellbore pressure profile more accurately. Such an approach may be used to model processes under various conditions, such as different wellbore inclination angles, different wellbore geometries, and different drilling fluids.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures.

The invention claimed is:

1. An apparatus for measuring slip velocity of drill cuttings obtained from a subsurface formation, the apparatus comprising:
   a first cylindrical tube having a first diameter and a first length, wherein the first tube is attached to a base plate, wherein the first tube has a diameter of about 10 cm and a length of about 50 cm;
   a second cylindrical tube having a second diameter smaller than the first diameter and a second length larger than the first length, the second tube attached to a lower portion of the first tube and running substantially parallel to the first tube; and
   an ultrasonic device operatively connected to an opening of the second tube for measuring a level of a fluid in the second tube.

2. The apparatus of claim 1, wherein the first tube in combination with the second tube forms a substantially U-shaped tube with two openings.

3. The apparatus of claim 1, further comprising:
   a computer operatively connected to the ultrasonic device, the computer configured to store and analyze data received from the ultrasonic device.

4. The apparatus of claim 1, wherein an upper portion of the second tube comprises gradations that are about 1 mm apart.

5. The apparatus of claim 1, wherein the second tube has a diameter of about 1 cm and a length of about 60 cm.

6. A method for determining slip velocity of drill cuttings using the apparatus of claim 1, the method comprising:
filling the first tube with a drilling fluid comprising at least one of diesel and brine;
equalizing the level of the drilling fluid in the first and the second tubes;
determining density of the drill cuttings obtained from the subsurface formation;
introducing the drill cuttings into the first tube;
initiating a timer and letting the drilling fluid stabilize in the first tube and the second tube; and
determining slip velocity of the drill cuttings based on the time taken to stabilize in the first tube and the second tube and the length of the first tube.

7. A system for measuring slip velocity of drill cuttings obtained from a subsurface formation, the system comprising:
a first cylindrical tube having a first diameter and a first length, wherein the first tube is attached to a base plate;
a second cylindrical tube having a second diameter smaller than the first diameter and a second length larger than the first length, the second tube attached to a lower portion of the first tube and running substantially parallel to the first tube, wherein the second tube has a diameter of about 1 cm and a length of about 60 cm; and
an ultrasonic device operatively connected to an opening of the second tube for measuring a level of a fluid in the second tube; and
a computer operatively connected to the ultrasonic device, the computer configured to store and analyze data received from the ultrasonic device.

8. The system of claim 7, wherein the first tube in combination with the second tube forms a substantially U-shaped tube with two openings.

9. The system of claim 7, wherein an upper portion of the second tube comprises gradations that are about 1 mm apart.

10. The system of claim 7, wherein the first tube has a diameter of about 10 cm and a length of about 50 cm.

11. A method for determining slip velocity of drill cuttings using the system of claim 7, the method comprising:
filling the first tube with a drilling fluid comprising at least one of diesel and brine;
equalizing the level of the drilling fluid in the first and the second tubes;
determining density of the drill cuttings obtained from the subsurface formation;
introducing the drill cuttings into the first tube;
initiating a timer and letting the drilling fluid stabilize in the first tube and the second tube; and
determining slip velocity of the drill cuttings based on the time taken to stabilize in the first tube and the second tube and the length of the first tube.

* * * * *